1

United States Patent Office 3,526,664
Patented Sept. 1, 1970

3,526,664
TRICHLORO AMIDINES AND PROCESS FOR PREPARING THEM
Clifford L. Coon, Fremont, Calif., assignor to Stanford Research Institute, Menlo Park, Calif., a corporation of California
No Drawing. Filed May 9, 1966, Ser. No. 548,393
Int. Cl. C07c *123/00*
U.S. Cl. 260—564      7 Claims

ABSTRACT OF THE DISCLOSURE

N,N,N′-trichloroamidines are produced by passing fluorine gas in contact with hydrocarbyl amidine and an aqueous solution containing a stoichiometrically excess quantity of chlorine ions, e.g. potassium chloride, the reaction being continued preferably until the formation of a heavy orange liquid ceases to be formed. The compounds so produced are useful as chlorinating agents, bleaches, bactericides and the like.

SUMMARY OF THE INVENTION

This invention relates to certain novel and useful compounds, as well as to a novel manner of obtaining relatively simply and cheaply this new class of compounds in high yields.

More specifically stated, in accordance with one aspect of this invention, certain new polychloro substituted amidines have been discovered which are highly effective as chlorinating agents, bleaches and disinfectants.

The new polychlorinated amidines of this invention have the general structural formula:

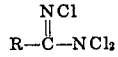

$$R-\underset{\underset{}{\overset{\overset{NCl}{\|}}{C}}}{}-NCl_2$$

in which R is an unsubstituted hydrocarbyl radical, which latter may be an alkyl, aryl, alkaryl or aralkyl radical. Examples of the alkyl radicals are: methyl, ethyl, n-propyl, iso-propyl, n-butyl, isobutyl, pentyl, hexyl, cyclohexyl, methyl cyclohexyl, ethyl cyclohexyl, dimethy cyclohexyl, and their homologues and analogues. The phenyl radical is an illustrative example of an aryl trichloro substituted amidine, while amidines of the above general structural formula in which the R is the benzyl radical, a tolyl radical, or a xylyl radical, are illustrative examples of the novel class of trichloro substituted amidines of the above class having an alkaryl or aralkyl radical in the place of the R in the above general structural formula.

The following are illustrative examples of the novel N,N,N′-trichloro substituted amidines of the present invention, which compounds may also be produced by the novel process described below.

N,N,N′-trichloroacetamidine,
N,N,N′-trichloropropionamidine,
N,N,N′-trichlorobutyramidine,
N,N,N′-trichloroisobutyramidine,
N,N,N′-trichlorovaleramidine,
N,N,N′-trichlorobenzamidine,
N,N,N′-trichlorobenzylamidine,
N,N,N′-trichloroxylylamidine,
N,N,N′-trichlorocyclohexylamidine, and their homologues and analogues.

As indicated above, and as shown in greater detail hereinbelow, the novel compounds of this class of N,N,N′-trichloro substituted amidines are all highly effective as chlorinating agents, bleaches and disinfectants, as well as intermediaries in the production of other valuable and useful products.

In accordance with another aspect of the present invention, the above-defined class of novel and useful N,N,N′-trichloro substituted amidines may be produced in a novel manner and in high yields by contacting the corresponding unsubstituted hydrocarbyl amidine with fluorine gas in the presence of chloride ions which are preferably present in an amount which is in excess of that necessary to convert the unsubstituted hydrocarbyl amidine to the aforementioned corresponding N,N,N′-trichloro substituted derivative thereof.

More specifically stated, the above-defined novel class of hydrocarbyl trichloro amidines may be prepared effectively, cheaply and in high yields by contacting hydrocarbyl amidines, preferably as their hydrochloride salts, and preferably in the form of aqueous solutions thereof, to the action of fluorine gas, the hydrocarbyl amidine hydrochloride being preferably dissolved in water containing a stoichiometric excess of chloride ion. The term "stoichiometric excess of chloride ion" as used herein, is intended to mean that the chloride ions are present in the solution in an amount in excess of that which would or could convert the unsubstituted hydrocarbyl amidine to the corresponding N,N,N′-trichloro substituted derivative thereof, i.e. in excess over all of the active hydrogens attached directly to the amidine nitrogens. Although the fluorine gas may be used as such in this oxidative chlorination reaction, it has been found advantageous to dilute it in an inert gas, such as nitrogen. This permits closer control of the reaction. The concentration of the fluorine in the inert gas (e.g. nitrogen) is not critical: it has been varied from as low as 5% $F_2$ (or even lower) to higher than 35% with very little effect, if any, on the reaction. Also, it has been found that the subject reaction may be conducted at any temperature commensurate with the stability of the final product to be produced. Thus, the novel trichloro substituted amidines can be produced in high yields when the reaction is effected at temperatures as low as minus 5° C., or even lower temperatures, and also at ambient temperatures, or even higher ones.

Although there is no intention of being limited by any theory of the case, it is presently believed that unexpected chlorination, or rather chlor-substitution of the hydrogens on the nitrogens can be explained as being due to an oxidative chlorination reaction by which the fluorine (which is passed through the aqueous solution of the hydrocarbyl amidine) oxidizes the chloride ion (present in said solution) to chloronium ion; the hydrogens on the nitrogens of the amidines are then replaced by the positive chlorine, giving the overall effect of the following reaction:

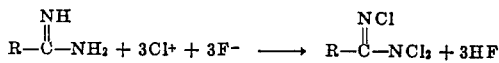

$$R-\underset{\underset{}{\overset{\overset{NH}{\|}}{C}}}{}-NH_2 + 3Cl^+ + 3F^- \longrightarrow R-\underset{\underset{}{\overset{\overset{NCl}{\|}}{C}}}{}-NCl_2 + 3HF$$

It has been pointed out that a preferred process of preparing the subject N,N,N′-trichloro substituted amidines involves the use (as a starting material) of the unsubstituted hydrocarbyl amidines as their hydrochloride salts. These are dissolved in water, in which they are highly soluble. The hydrochloride salt is used because of its greater stability.

Also, it was pointed out that the aqueous solution should preferably contain an excess of chloride ion, which latter may be obtained by the addition to the water solution of an alkali metal chloride, i.e. potassium chloride or sodium chloride. Any other manner of obtaining and maintaining an excess of chloride ion in the reaction solution may also be used.

A more comprehensive understanding of the invention may be obtained by reference to the following examples which illustrate specific embodiments of the manufacture of the novel N,N,N′-trichloro amidines in accordance with the process of the present invention.

EXAMPLE I

An aqueous solution was prepared by dissolving 5 grams (0.041 mole) of butyramidine hydrochloride in 82 ml. of water which contained 18.24 grams (0.245 mole) of potassium chloride. The solution was maintained at minus 5° C., and a mixture of 25–30 volume percent of fluorine gas in nitrogen gas was passed through said solution. This resulted in the formation of a distinctly orange liquid which continued to be formed (and mostly separated out as a distinct phase) during the 3½ hour reaction period. The reaction mixture was then repeatedly extracted with chloro-trifluoromethane, and the extracts were then combined, dried and evaporated to produce 7.0 grams (i.e. a yield equal to 90% of theoretical) of crude N,N,N'-trichlorobutyramidine having a B.P. 34–35° C. at 0.15 mm. Hg, and a refractive index $n_D^{25}$ of 1.5266.

The nuclear magnetic resonance spectra of a neat sample of the reaction product were:

7.20τ 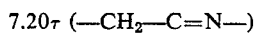 (—CH$_2$—C=N—)

8.26 (CH$_3$—CH$_2$—), 8.99 (CH$_3$—), which were thus consistent with the above structure. Also, elemental analysis (calculated for C$_4$H$_6$N$_2$Cl$_3$).—Calculated (percent): C, 25.33; H, 3.72; N, 14.78; Cl, 56.07. Found (percent): C, 26.00; H, 3.96; N, 14.61; Cl, 55.43.

EXAMPLE II

A solution of 10 grams (0.082 mole) of butyramidine in 52 ml. of water, which solution also contained about 12.1 grams (0.163 mole) of potassium chloride, was fluorinated at 0° C. with fluorine gas admixed with nitrogen. The resultant reaction mixture was treated as in Example I, the yield of N,N,N'-trichlorobutyramidine being equal to 52% of theoretical.

EXAMPLE III

The experiment described in Example II was repeated except for the substitution of 0.163 mole of hydrochloric acid for the potassium chloride used in the previous example. An analysis of the reaction mixture failed to indicate the presence of any N,N,N'-trichlorobutyramidine.

EXAMPLE IV

A solution of 20 grams of butyramidine hydrochloride in 40 ml. of water was fluorinated at −10° C. with a 15% mixture of fluorine in nitrogen until a heavy orange liquid no longer separated from the reaction mixture and the aqueous phase was clear. The orange liquid was separated from the aqueous phase, was dissolved in fluorotrichloromethane, and dried over magnesium sulfate. The dried solution was evaporated, and the product was distilled at 34–35° C. (at 0.15 mm. Hg) to yield 4.5 grams of N,N,N'-trichlorobutyramidine.

EXAMPLE V

A solution of 4.0 g. of acetamidine hydrochloride (0.0423 mole) and 6.3 g. (0.0846 mole) of potassium chloride in 30 ml. of water was fluorinated at 0° C. in the usual manner. After approximately 45 minutes an orange liquid separated, and the fluorination was continued until no more product separated. The reaction mixture was extracted with CFCl$_3$. From the organic phase there was isolated 3.56 g. of crude product (52% of theoretical). The liquid was distilled at 50–51° (4.5 mm.) to give 2.91 g. of a product which had the structural formula C$_2$H$_3$N$_2$Cl$_3$, and was analyzed to be N,N,N'-trichloroacetamidine.

EXAMPLE VI

A solution of 4.0 g. of acetamidine hydrochloride (0.0423 mole) and 6.3 g. (0.0846 mole) of potassium chloride in 30 ml. of water was fluorinated at 24° C. in the usual manner. The resultant reaction was treated as in Example V; the yield of N,N,N'-trichloroacetamidine was 3.34 g. or 49% of theoretical.

EXAMPLE VII

A solution of 2.50 g. of benzamidine hydrochloride and 2.50 g. of potassium chloride in 25 ml. of water was placed over 15 ml. of chloroform at 0° C. The mixture was stirred while a stream of 15% fluorine in nitrogen was passed through the aqueous phase. The reaction was stopped when the aqueous phase became clear. The mixture was extracted with chloroform and the extracts were dried over magnesium sulfate. Removal of the solvent left 1.41 g. of an orange oil which consisted mainly of N,N,N'-trichlorobenzamidine. Purification was accomplished by passing the crude product through a silica gel column using a two to one mixture of hexane in chloroform as eluent and collecting the first yellow band which eluted. Removal of solvent left 0.91 g. of a light yellow solid, M.P. 41°–47°. Recrystallization from petroleum ether gave pure N,N,N'-trichlorobenzamidine, M.P. 46°–48°. Elemental analysis calculated for C$_7$H$_5$N$_2$Cl$_3$ (percent): C, 37.61; H, 2.26; N, 12.53; Cl, 47.60. Found (percent): C, 37.83; H, 2.44; N, 12.40; Cl, 47.70.

The trichloro amidines of the present invention are stable compounds which can be stored at ambient temperatures for long periods of time without any evidence of decomposition. These novel compounds have the property of being extremely reactive towards compounds containing carbon-carbon double bonds. Thus, violent reactions were observed when the N,N,N'-trichloro amidines of the present invention were added to, for example, cyclohexene; likewise, vigorous reactions occurred in the presence of 1-octene and allyl bromide. In these reactions the trichloro amidine acts as a chlorinating agent and adds chlorine to the carbon-carbon double bond. Thus, when N,N,N'-trichloroacetamidine was brought in contact with cyclohexene (in methylene chloride), the reaction mixture yielded a colorless liquid which was identified as trans-1,2-dichlorocyclohexane.

The trichloroamidines, e.g. N,N,N'-trichlorobutyramidine, were also found to yield an oxidizing gas (chlorine) when the novel amidines were treated, in solution in methylene chloride, benzene, diethyl ether, acetone, chloroform, methanol, or other solvents, with activated charcoal.

Those skilled in the art appreciate that other hydrocarbyl amidines may be treated in accordance with the process described and claimed herein to produce other (but related) novel trichloro substituted amidines.

As many embodiments of this invention may be made without departing from the spirit and scope thereof, it is to be understood that the invention includes all such modifications as come within the scope of the appended claims.

I claim:

1. A chloro-substituted amidine having the structural formula

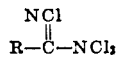

wherein R is a monovalent hydrocarbon radical selected from the group consisting of an alkyl radical of from 1 to 6 carbon atoms, a cyclo-alkyl radical of from 6 to 8 carbon atoms, and an aryl radical of from 6 to 8 carbon atoms.

2. N,N,N'-trichloroacetamidine.

3. N,N,N'-trichlorobenzamidine.

4. In a process for the production of N,N,N'-trichloroamidines, the step of passing fluorine gas in contact with an aqueous solution containing (1) a salt of an amidine compound having the structural formula

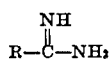

wherein R is a monovalent hydrocarbon radical selected from the group consisting of an alkyl radical of from 1 to 6 carbon atoms, a cyclo-alkyl radical of from 6 to 8 carbon atoms, and an aryl radical of from 6 to 8 carbon atoms, and (2) a stoichiometrically excess quantity of chloride ions as supplied by an alkali metal chloride, and recovering the corresponding N,N,N'-trichloroamidine compound from the reaction mixture.

5. The process according to claim 4 wherein an aqueous solution of potassium chloride is used as the source of chloride ions.

6. The process according to claim 5 wherein the amidine compound used is acetamidine hydrochloride, and wherein the passage of fluorine gas is continued until a heavy orange liquid ceases to be formed.

7. The process according to claim 5 wherein the amidine compound used is benzamidine hydrochloride, wherein the reactants are maintained at about 10° C., and wherein fluorine is passed through the aqueous solution as a gaseous mixture comprising between about 5% and about 35% of fluorine in nitrogen.

References Cited

UNITED STATES PATENTS 2,472,361   6/1949   Arsem _____ 260—583

OTHER REFERENCES

Miller et al., "Journal American Chemical Society," vol. 78, pages 4992–95 (1956).

ROBERT V. HINES, Primary Examiner

U.S. Cl. X.R.

23—219; 252—95, 106; 260—648, 653.8; 424—326